(12) United States Patent
Friedrich et al.

(10) Patent No.: US 8,069,880 B2
(45) Date of Patent: Dec. 6, 2011

(54) PRESSURE CAST CONCRETE OR MORTAR LINED STEEL PIPES AND METHODS OF MAKING THE SAME

(75) Inventors: Ralph S. Friedrich, Hermosa Beach, CA (US); Qizhong Sheng, Cerritos, CA (US); Paul Kubat, La Mirada, CA (US)

(73) Assignee: Ameron International Corporation, Pasadena, CA (US)

( * ) Notice: Subject to any disclaimer, the term of this patent is extended or adjusted under 35 U.S.C. 154(b) by 860 days.

(21) Appl. No.: 12/061,263

(22) Filed: Apr. 2, 2008

(65) Prior Publication Data

US 2009/0250135 A1    Oct. 8, 2009

(51) Int. Cl.
*F16L 9/00* (2006.01)
*B28B 5/00* (2006.01)

(52) U.S. Cl. ........ 138/176; 138/143; 138/146; 138/175; 138/DIG. 5; 264/228; 264/516

(58) Field of Classification Search ............... 138/176, 138/175, 143, DIG. 5, 146; 264/228, 516
See application file for complete search history.

(56) References Cited

U.S. PATENT DOCUMENTS

| | | | | |
|---|---|---|---|---|
| 2,474,660 A | * | 6/1949 | Fitzpatrick | 264/42 |
| 4,247,516 A | * | 1/1981 | Morgan | 264/503 |
| 5,791,378 A | * | 8/1998 | Stephens | 138/98 |
| 6,076,562 A | * | 6/2000 | Kuo | 138/175 |
| 6,174,569 B1 | * | 1/2001 | Blomer et al. | 427/410 |

FOREIGN PATENT DOCUMENTS

FR    1264614    6/1961

OTHER PUBLICATIONS

International Search Report and Written Opinion for corresponding International Application No. PCT/US2009/039091 dated Dec. 16, 2009; total 14 pages.
International Preliminary Report of Patentability (IPRP) for corresponding International Application No. PCT/US2009/039091 dated Feb. 24, 2011; total 9 pages.

* cited by examiner

*Primary Examiner* — James Hook
(74) *Attorney, Agent, or Firm* — Connolly Bove Lodge & Hutz LLP (57) ABSTRACT

Pressure cast lined steel pipes comprise an annular concrete or mortar liner along an inside diameter, and a metal shell surrounding the liner, wherein the liner is in direct contact with the metal shell. The wall thickness of the liner can be from 10 to 50 times the thickness of the metal shell. The pipe may be coated with a dielectric material. A mold assembly used to form the pipe includes an annular concrete or mortar composition chamber formed between the metal shell and an inner mold member. Pressurized water is used in the mold assembly to pressurize the concrete or mortar composition and exert a desired pressure force onto the metal shell while the composition cures in the mold. Once a desired degree of cure is achieved, the pressure is removed causing the metal shell to exert a desired compression force onto the cured liner.

34 Claims, 4 Drawing Sheets

PRESSURE CAST CONCRETE OR MORTAR LINED STEEL PIPES AND METHODS OF MAKING THE SAME

FIELD OF THE INVENTION

This invention relates to concrete or mortar lined steel pipes and, more particularly, to pressure-cast concrete or mortar lined steel pipes that are made using methods that permit the simultaneous curing and prestressing of the pipe to thereby increase allowable design stress in the steel while maintaining manufacturing efficiency and reducing manufacturing costs.

BACKGROUND OF THE INVENTION

Conventional concrete lined steel water pipe, e.g., large diameter pipe, is currently designed to a maximum working stress in the steel of around 21,000 psi. The reason for limiting the allowable design stress in such pipe is the limited allowable strain in the concrete or mortar lining. A higher steel stress will crack the concrete or mortar lining under pressure, causing deleterious cracks to form, adversely affecting the lining's performance, and creating the potential for the lining to fail or otherwise fall out of the inside of the steel pipe.

The use of concrete or mortar linings with such steel pipe is well known for use in the water pipe industry because they have a proven record of protecting the steel pipe from interior corrosion for a long period of time, e.g., of more than 50 years. As an alternative to concrete linings, polymer coatings such as epoxy based coatings and the like can be used with steel pipes that can be designed having a higher strain to failure. However, no currently available polymer coating can be guaranteed or expected to last 50 years in water service without some form of periodic maintenance, typically at approximately 15 year intervals. It is not practical to take such coated steel water pipes, e.g., when used as a water main or the like, out of service to sandblast and recoat the lining every 15 or so years for maintenance purposes.

A second limitation for concrete lined steel water pipe is the engineering consideration and need to have a diameter to thickness ratio of around 240, and preferably less than about 220. This means that a 100-inch diameter pipe must have a minimum pipe wall thickness of approximately 0.417-inch (D/t=240; t=100/240=0.417). The effect of this design requirement is that pipe which could have been designed with a lesser wall thickness due to internal pressure, requires a greater thickness due to handling, shipping and installing stresses. In this 100" ID×0.417" wall example, pipe rated at P=(2*t*stress)/D=2*0.417*21,000/100=175 psi or less must still have a pipe wall thickness based on D/t=240. The D/t requirement is based on the practicality of handling, shipping and installing the pipe. In poor soil conditions, the pipe is also vulnerable to collapse or over deflection if not stiffened by increased liner thickness, steel pipe wall thickness, attached stiffeners, or the expensive importation of more stable bedding materials.

Conventional prestressed concrete cylinder pipe (PCCP) comprises an inner concrete pipe or core that is placed in state of high compression by the use of wires that are wound around the inner pipe. The pressure loads that are placed on the pipe in service are taken by the prestressed steel wires using high allowable design stress, therefore also operating to reduce the amount of steel that is used in providing the desired amount of compression. The concrete core resists the prestressing wires and helps support the earth loads in a buried condition. The prestressed concrete core also helps to support the pipe during transport and installation.

One of the problems, however, with PCCP is the difficulty in protecting the high strength prestressing wires from corrosive environments when the pipe is placed into service, and the potential susceptibility of such wires to hydrogen embrittlement if excessive levels of cathodic protection are applied. The ability to easily cathodically protect the prestressing wire is further complicated by the low dielectric strength of the typical mortar coating that is placed over the prestressing wires to protect them from corrosion. The dielectric resistance can be improved by the application of a suitable polymer coating, e.g., such as one available from Ameron International under the product name Amercoat 1972B. While the use of such a polymer coating makes it easier to cathodically protect the steel prestressing wires, it does so at an additional cost in terms of both manufacturing steps and in terms of raw material cost.

As the underground utility complex of pipes and surface or subsurface transit systems in typical major cities have increased over the years, another problem has arisen from "cathodic interference" or stray ground currents caused by nearby steel pipelines under cathodic protection for exterior corrosion, and caused by DC powdered transit systems. Large water pipes installed many years ago now find new pipes that have been installed nearby. These new pipes may be cathodically protected, and the stray ground currents introduced from the cathodic protection can cause corrosive currents in the PCCP. As a result of the possible existence of such stray ground currents, many metropolitan water agencies now prefer either conventional steel pipe with a dielectric coating for external corrosion protection, or steel cylinder reinforced concrete pipe when external loads are high. Although this is an effective approach for controlling pipe corrosion, it is costly.

One approach known in the art for making prestressed steel pipe has been to use a multi-step process of first forming/casting a concrete core, slipping a steel pipe over the pre-cast concrete core, and then pumping a high-pressure grout into the annular gap between the pre-cast concrete core and steel pipe to place the concrete core under compression. However, two major problems exist with this method of making pipe. A first problem relates to the difficulty in perfectly sealing the ends of the concrete core to the steel pipe during the pressure grouting operation. A second problem involves how to apply and maintain pressure to the grout during the cure of the grout, especially if minor leakage of the grout occurs at the seals between the steel pipe and concrete core while the grout is curing. If a high-pressure grout pump is used, the potential leakage of grout during cure must be made up by the grout pump. This will mean the grout pump will have to be active during the curing operation in order to make up for leakage, which leaves the potential for the grout to cure in the pump, both ruining the pump and resulting in pipe having an insufficient level of prestress.

It is, therefore, desired that a pipe construction and method for making the same be developed that is capable of providing a desired level of properties such as pipe stiffness and internal corrosion resistance that matches the typical minimum 50 year service life offered by conventional PCCP or concrete lined steel pipe. It is further desired that such pipe construction be capable of providing a desired degree of protection from external corrosion and cathodic interference. It is still further desired that such pipe construction be manufactured in a manner that is both cost efficient from a raw material perspective, and from the amount of time and labor involved in making the same.

SUMMARY OF THE INVENTION

Pressure cast lined steel pipes of this invention comprise an annular concrete or mortar liner forming an inside diameter of the pipe, and a metal shell surrounding the liner. The liner is in direct contact with an inside wall surface of the metal shell, and the liner is placed in a state of compression by the metal shell. The ratio of the wall thickness between the liner and the metal shell is in the range of from about 5:1 to 80:1, and preferably from about 10:1 to 50:1. In an example embodiment, the wall thickness of the metal shell is in the range of from about 0.06 to 0.75 inches, and the wall thickness of the liner is in the range of from about 1.5 to 10 inches. The wall thickness of the liner can be from 10 to 50 times the thickness of the metal shell depending on the particular pipe embodiment and end-use application. If desired, the pipe can further comprise a coating of dielectric material disposed along an outside surface of the metal shell.

The pipes are formed by using a mold assembly that is specially constructed to facilitate accommodating a desired volume of the concrete or mortar composition and subjecting the same to a pressurizing force calculated to impose a desired stressing force onto the metal shell. In an example embodiment, such pipes are formed by delivering a volume of the concrete or mortar composition into a mold formed between a metal shell along an outside diameter and a movable core member along an inside diameter. The poured composition is subjected to a pressure force to expand the metal shell. In an example embodiment, the pressure force is provided in the form of a pressurized fluid such as water, wherein the pressurized fluid is placed into contact with the surface of the poured composition. Once a desired degree of cure is achieved, the pressure force is removed causing the metal shell to exert a desired compression force on the concrete or mortar liner.

In an example embodiment, the mold assembly comprises a cylindrical metal shell that defines the metal outer portion of the pipe, a base member that is operatively connected with a bottom portion of the metal shell, and a top member that is operatively connected with a top portion of the metal shell. An inner mold member is positioned concentrically inwardly of the metal shell. An annular concrete or mortar chamber is formed between the metal shell and inner mold member for accommodating a volume of a concrete or mortar composition therein. In an example embodiment, the inner mold member is capable of reducing in diameter to accommodate removal of the pressure cast lined pipe from the mold after formation. The assembly further comprises a means for introducing a fluid pressurizing medium, such as water, into the mold and onto a surface of the concrete or mortar composition to cause the composition to expand the metal shell.

Pressure cast lined steel pipes of this invention provide a desired level of pipe stiffness and internal corrosion resistance that matches the typical minimum 50 year service life offered by conventional PCCP or concrete lined steel pipe. Further, such pipes of this invention are capable of providing a desired degree of protection from external corrosion and cathodic interference. Still further, pipes of this invention can be formed having a reduced metal shell or steel pipe wall thickness, thereby resulting in a desired savings of raw material costs.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Pressure cast lined steel pipes (PCSPs), and methods for making the same according to principles of the invention, comprise a concrete or mortar liner that is surrounded by a metal shell or steel pipe, i.e., avoiding the use of tensioning or prestressing wires as present in the conventional PCCP described above. The ratio of liner thickness to shell thickness can and will vary depending on the particular engineering design requirements and/or performance criteria called for by a particular end use application, as described in greater detail below.

A feature of such PCSP constructions is that they are made according to one or more different pressure casting techniques that provide for the formation of the concrete or mortar liner in situ during the process of prestressing the surrounding metal shell and resulting pipe construction, thereby avoiding multiple steps, e.g., involving separately forming a precast concrete or mortar liner that is combined with a metal outer pipe shell for subsequent stress inducing treatment. As used herein, the term "in situ" is used to refer to the fact that a concrete or mortar composition (that is used to make the concrete or mortar liner) is being formed and cured at the same time as it is being pressurized for the purpose of placing a surrounding metal outer shell or steel pipe in a stressed condition.

A feature of PCSPs of this invention is that they are constructed in a manner that prestresses the metal shell with a concrete or mortar liner such that the steel stresses could be increased by internal fluid pressure without fear of deleteriously cracking the liner. Further, the presence of a compressed concrete or mortar liner also helps resist transportation, installation, and earth loads when placed into service. PCSPs of this invention can also be coated with a number of dielectric coatings, thereby providing a desired level of external corrosion protection. This eliminates the problem of cathodic interference from nearby pipelines and transit systems, and the steel used in this type of pipe would have much lower yield stress than the prestressing wire and therefore be much less susceptible to hydrogen embrittlement while under cathodic protection.

Figure 1:
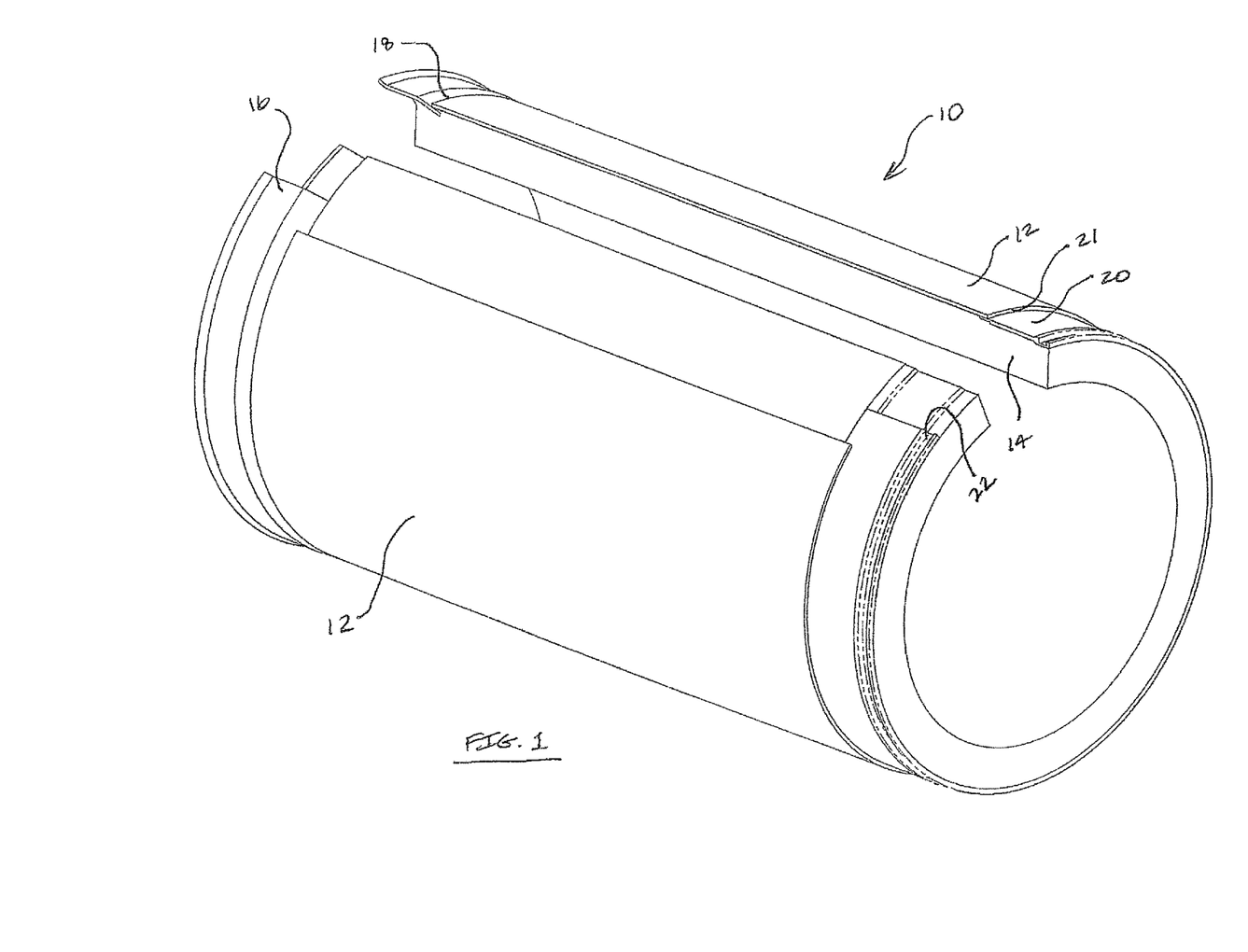
FIG. 1 is a perspective side view of an example embodiment pressure-cast steel pipe constructed according to the principles of the invention.

FIG. 1 illustrates a PCSP 10 constructed according to principles of this invention, generally comprising a cylindrical metal or steel shell, casing, pipe or jacket 12 that surrounds an inner liner 14 formed from a desired concrete or mortar composition. The inner liner 14 is disposed concentrically within an inside diameter of the shell 12, and in an example embodiment is in direct contact with the shell, i.e., there is no other type of intermediate material that is interposed between the liner and the shell.

The PCSP 10 includes a bell shaped end 16 that is attached at one axial end 18 of the pipe 10 and a spigot 20 that is attached to the opposite end 21 of the pipe 10. The spigot 20 is designed having an outer diameter sized and shaped to fit within the bell shaped end 16 of another pipe, and includes one or more annular grooves 22 disposed circumferentially therearound that are configured to accommodate one or more annular sealing members or seals (a shown in FIG. 2) respectively therein to provide a desired leak-tight seal between adjacent pipe ends. The bell and spigot ends 16 and 20 can be configured the same or similar to those used with conventional steel pipe, and are attached to ends of the metal shell by appropriate weld technique. The sealing members can be formed from an elastomeric material. Other joining techniques used for conventional steel pipe, such as those using formed bell and spigot ends or other differently configured ends, butt welding plain end pipe, or lap welding steel pipe are equally adaptable to PCSP, as would be understandable by someone skilled in the art of steel pipe design.

While an example embodiment of the PCSP illustrated in FIG. 1 is shown with specific types of ends, it is to be understood that PCSPs of this invention can be configured having different types of ends as called for by the particular end-use application. For example, the PCSP can have joint rings (in the form of the bell and spigot as shown), or it can be can be butt welded in the field, or it can have a swaged bell to slip fit the steel pipe OD for a lap weld in the field, or it can have a swaged bell, including a sealing groove to seal against the steel pipe OD, or can have a rolled spigot groove (spigot rolled right into the pipe wall) that fits inside a swaged bell (swaged into the pipe wall). It is to be understood that PCSPs constructed according to principles of this invention can comprise all such noted versions.

Another feature of the PCSP is that the concrete or mortar liner 14 is placed in a desired state of compression, prior to placement of the completed pipe in an application destination, e.g., before the pipe is transported and buried some depth within the ground, by operation of the metal shell 12 acting directly on the liner. In an example embodiment, the metal shell 12 is stressed a desired degree during the process of casting, i.e., pouring and curing, the liner 14 in a manner placing the liner once cured in a desired state of compression to meet a desired pipe performance criteria, e.g., to meet a particular end-use application.

The thickness of the shell and liner for PCSPs can and will vary depending on the particular design/performance criteria and/or end-use application. A general feature of the PCSP is that the thickness of the steel shell is much less than that of a conventional steel pipe (i.e., not comprising a concrete liner under compression). The combination of a thinner steel shell with a thicker liner in a state of compression allows the use of D/t ratios that are not otherwise possible with conventional steel pipe, which would have too much flexibility to resist the handling and installation loads at these higher D/t ratios. The thinner steel shell can now be designed using higher design stress without deleteriously cracking the concrete or mortar liner at operating pressure. The use of a steel shell as contrasted to the use of tensioning or prestressing wires in a PCCP places the liner in a desired state of compression with a much more robust structure that can be made more resistant to exterior corrosion and that provides a failure mechanism that is more predictable than the tensioning or prestressing wires.

For example, when the tensioning or prestressing wires used in conventional PCCP fail due to exterior corrosion the result can be a sudden loss of compressive force on the concrete liner, which could cause a sudden failure of the pipe. Further, the repair of broken tensioning wires is difficult to perform while the pipe is in the ground. PCSP of this invention has a failure mechanism resembling that of steel pipe, i.e., one characterized by a gradual leakage through the steel shell that does not result in a sudden loss of compression to the concrete or mortar liner, and one that can be readily repaired in the field by the use of an external metal patch or the like by welding process.

PCSPs constructed according to principles of this invention comprise a concrete or mortar liner or core and a surrounding metal shell or steel pipe. The relative thicknesses of the liner to the shell can vary depending on the engineering design criteria, the nature of the materials that are used, and the desired performance properties. In an example embodiment, the ratio of the liner to metal shell wall thickness can be in the range of from about 5:1 to 80:1, and preferably in the range of from about 10:1 to 50:1. The typical strength range for the liner will be from about 3,000 to 10,000 psi, with a prestress range on the liner from about 500 psi to 6,000 psi when the internal pressure is reduced to zero and the stress on the outer steel pipe is partially transferred to the concrete or mortar core. The allowable design stress on the steel shell could range from about 25,000 to 72,000 psi, depending on the required pressure rating and the yield of the steel used in the outer steel shell.

Generally speaking, it is desired that the liner or core be approximately 10 to 50 times the thickness of the metal shell. As an example, the cylindrical metal shell can initially be stressed to about 42,000 psi when under pressure. This is twice the current design stress for steel pipe, resulting in a steel pipe wall having about one half the current wall thickness. Because steel represents the major material cost for the pipe, reducing the wall thickness of the steel component in half for the PCSP represents a substantial savings in raw material costs.

The reduction in diameter of the liner, core or inner pipe after releasing the casting pressure during formation of the PCSP will depend on the thickness and modulus of the core, the thickness of the metal shell or steel pipe and the amount of stress in the steel while under the casting pressure. A force balance is set up between the steel cylinder and the core (i.e. they are two springs opposing each other). The change in strain in the core must also equal the change in strain in the steel pipe. A series of equations can be set up to match these criteria. Such equations are provided below for reference for an example PCSP having an 84 inch inside diameter.

84-inch Class 150 Pressure Cast Steel Pipe

The manufacturing process incorporates pressurizing the outer steel pipe and mold during the casting and cure of the concrete lining. Pressurizing the mold places the outer steel pipe into tension during the casting process.

When the pressure maintained during the casting operation is released, the outer steel pipe will shrink down onto the concrete liner It will continue to shrink until the force in the concrete liner equals the force exerted by the steel pipe. The following equations can be defined.

$ForceSteelperUnitLength = ForceConcreteperUnitLength$  Equation (1)

$ForceSteelperUnitLength = t_{Steel} \cdot \sigma_{Steel}$  Equation (2)

$ForceConcreteperUnitLength = t_{Concrete} \cdot \sigma_{Concrete}$  Equation (3)

Substituting Equations (2) and (3) into Equation (1)

$t_{Steel} \cdot \sigma_{Steel} = t_{Concrete} \cdot \sigma_{Concrete}$ $\sigma_{Concrete} = \dfrac{t_{Steel} \cdot \sigma_{Steel}}{t_{Concrete}}$  Equation (4)

$\Delta\varepsilon_{Concrete} = \Delta\varepsilon_{Steel}$  Equation (5)

$\Delta\varepsilon_{Concrete} = \dfrac{\sigma_{Concrete}}{E_{Concrete}}$  Equation (6)

$\Delta\varepsilon_{Steel} = \dfrac{\sigma_{SteelCasting} - \sigma_{Steel}}{E_{Steel}}$  Equation (7)

Substituting Equations (6) and (7) into Equation (5)

$\dfrac{\sigma_{SteelCasting} - \sigma_{Steel}}{E_{Steel}} = \dfrac{\sigma_{Concrete}}{E_{Concrete}}$  Equation (8)

Substituting Equation 4 into Equation 8:

$\dfrac{\sigma_{SteelCasting} - \sigma_{Steel}}{E_{Steel}} = \dfrac{t_{Steel} \cdot \sigma_{Steel}}{t_{Concrete} \cdot E_{Concrete}}$  Equation (9)

$\dfrac{\sigma_{SteelCasting}}{E_{Steel}} = \left(\dfrac{t_{Steel}}{t_{Concrete} \cdot E_{Concrete}} + \dfrac{1}{E_{Steel}}\right) \cdot \sigma_{Steel}$ $\sigma_{Steel} = \dfrac{\sigma_{SteelCasting}}{E_{Steel} \cdot \left(\dfrac{t_{Steel}}{t_{Concrete} \cdot E_{Concrete}} + \dfrac{1}{E_{Steel}}\right)}$ Assume the following criteria for a pipe design:

$ID_{Pipe} := 84 \cdot in$ — ID of pipe $SMYS := 60000 \cdot psi$ — Specified Minimum Yield Strength of the steel in the pipe wall $PresssureRating := 150 \cdot psi$ — Operating pressure $t_{Concrete} := 4 \cdot in$ — Thickness of concrete core $E_{Concrete} := 4000000 \cdot psi$ — Modulus of concrete $E_{Steel} := 30000000 \cdot psi$ — Modulus of steel $ID_{Steel} := ID_{Pipe} + 2 \cdot t_{Concrete}$ — ID of Steel Pipe to produce specified pipe ID $ID_{Steel} = 92 \cdot in$ $\sigma_{SteelDesign} := 0.72 \cdot SMYS$ — Allowable design stress for steel at 72% of SMYS $\sigma_{SteelDesign} = 4.32 \times 10^4 \cdot psi$ $\sigma_{SteelCasting} := 0.90 \cdot SMYS$ — Stress in steel during the casting operation. This stress should be at or below 90% of Specified Minimum Yield Strength (SMYS) of steel.

$\sigma_{SteelCasting} = 5.4 \times 10^4 \cdot psi$ $t_{Steel} := PressureRating \cdot \dfrac{ID_{Steel}}{2 \cdot \sigma_{SteelDesign}}$ — Thickness of steel at allowable design stress for pressure loads only $t_{Steel} = 0.1597 \cdot in$ $CastingPressure := \dfrac{\sigma_{SteelCasting} \cdot 2 \cdot t_{steel}}{ID_{Steel}}$ — Casting pressure at 90% of SMYS $CastingPressure = 187.5 \ psi$ $DoverT := \dfrac{ID_{Steel}}{t_{Steel}}$ — Diameter over thickness ratio. Maximum allowable for current steel pipe design is around 220.

$DoverT = 576$ $TConcreteOverTSteel := \dfrac{t_{Concrete}}{t_{Steel}}$ — Generally is between 10 and 50 to get practical levels of concrete pre-stress and thickness. Ratio can be higher or lower for specific applications.

$TConcreteOverTSteel = 25.043$ $\sigma_{Steel} := \dfrac{\sigma_{SteelCasting}}{E_{Steel} \cdot \left(\dfrac{t_{Steel}}{t_{Concrete} \cdot E_{Concrete}} + \dfrac{1}{E_{Steel}}\right)}$ — This is the pre-stress in the steel after releasing the casting pressure.

$\sigma_{Steel} = 4.156 \times 10^4 \cdot psi$ $\sigma_{Concrete} := \dfrac{t_{Steel} \cdot \sigma_{Steel}}{t_{Concrete}}$ — Concrete stress in the zero pressure condition. This is the pre-stress in the concrete after releasing the pressure in the mold.

$\sigma_{Concrete} = 1.659 \times 10^3 \cdot psi$

Comparisons of Pipe Stiffness for Conventional Steel Pipe vs. Pressure Cast Steel Pipe For Conventional Steel Pine:

$t_{Liner} := 0.5 \cdot in$ — Thickness of liner on conventional steel pipe

-continued $t_{Stl} := \frac{ID_{Steel} + 2 \cdot t_{Liner}}{220}$    Approximate thickness of steel pipe to meet D/t of 220 for conventional steel pipe design $t_{Stl} = 0.423 \cdot in$ $E_{Concrete} := 4000000 \cdot psi$    Modulus of concrete liner $E_{Steel} := 30000000 \cdot psi$    Modulus of steel

| Section | Area | Y |
|---|---|---|
| Concrete Liner | $A_{Concrete} := \frac{E_{Concrete}}{E_{Steel}} \cdot t_{Liner}$ | $Y_{Concrete} := \left(\frac{t_{Stl} + t_{Liner}}{2}\right)$ |
| | $A_{Concrete} = 0.067 \cdot in$ | |
| Steel Pipe Wall | $A_{StlWall} := \frac{E_{Steel}}{E_{Steel}} \cdot t_{Stl}$ | $Y_{StlWall} := 0 \cdot in$ |
| | $A_{StlWall} = 0.423 \cdot in$ | |

The sum of the areas can be calculated as follows:

$SUM_{Area} := A_{Concrete} + A_{StlWall}$ $SUM_{Area} = 0.489 \cdot in$

The sum of the areas times the distance to the reference centroid, can be calculated as follows:

$SUM_{Y\,Area} := A_{Concrete} \cdot Y_{Concrete} + A_{StlWall} \cdot Y_{StlWall}$ $SUM_{Y\,Area} = 0.031 \cdot in^2$ The distance to the centroid of the overall pipe wall from the middle of the steel pipe wall (the reference position for initially assumed centroid) can be calculated as follows:

$Y_{PipeWall} := \frac{SUM_{Y\,Area}}{SUM_{Area}}$ $Y_{PipeWall} = 0.063 \cdot in$ The moment of Inertia of the individual layers about their own neutral axis is calculated per unit length as follows:

$I_{Concrete} := \frac{t_{Liner}^3}{12}$ $I_{Concrete} = 0.01 \cdot in^3$ $I_{StlWall} := \frac{t_{Stl}^3}{12}$ $I_{StlWall} = 6.295 \times 10^{-3} \cdot in^3$ The sum of the EI values for all layers is calculated as follows:

$EI_{Concrete} := E_{Concrete} \cdot [I_{Concrete} + t_{Liner} \cdot (Y_{PipeWall} - Y_{Concrete})^2]$ $EI_{Concrete} = 3.593 \times 10^5 \cdot in \cdot lbf$ $EI_{StlWall} := E_{Steel} \cdot [I_{StlWall} + t_{Stl} \cdot (Y_{Pipewall} - Y_{StlWall})^2]$ $EI_{StlWall} = 2.389 \times 10^5 \cdot in \cdot lbf$ $EI_{TotalPipeWall} := EI_{Concrete} + EI_{StlWall}$ $EI_{TotalPipeWall} = 5.982 \times 10^5 \cdot in \cdot lbf$ This the total "EI" value for the pipe wall. This value must be substituted into Equation 5-14 of AWWA Manual M45 to properly calculate overall pipe stiffness.

$D_{Centroid} := ID_{Pipe} + 2 \cdot t_{Liner} + t_{Stl} - 2 \cdot Y_{PipeWall}$ Centroid diameter of the conventional steel pipe.

$D_{Centroid} = 85.297 \cdot in$

Pipe Stiffness, PS, is determined as follows utilizing ASTM D2412.

$PS_{ConventionalSteelPipe} := \frac{EI_{TotalPipeWall}}{\left[0.149 \cdot \left(\frac{D_{Centroid}}{2}\right)^3\right]}$ $PS_{ConventionalSteelPipe} = 51.758 \cdot psi$    Pipe stiffness for conventional steel pipe For Pressure Cast Steel Pipe:

$t_{Steel} = 0.16 \cdot in$

Thickness of pressure cast steel pipe from above $t_{Stlk} := t_{Steel}$

Set thickness of steel to variable name used below $t_{Concrete} = 4 \cdot in$

Thickness of concrete liner in pressure cast steel pipe from above $t_{Con} := t_{Concrete}$ Set thickness of concrete to variable name used below $E_{Concrete} := 4000000 \cdot psi$ Modulus of concrete liner $E_{Steak} := 30000000 \cdot psi$ Modulus of steel

| Section | Area | Y |
|---|---|---|
| Concrete Liner | $A_{Concrete} := \frac{E_{Concrete}}{E_{Steel}} \cdot t_{Con}$ | $Y_{Concrete} := \left(\frac{t_{Stl} + t_{Con}}{2}\right)$ |
| | $A_{Concrete} = 0.533 \cdot in$ | |
| Steel Pipe Wall | $A_{StlWall} := \frac{E_{Steel}}{E_{Steel}} \cdot t_{Stl}$ | $Y_{StlWall} := 0 \cdot mm$ |
| | $A_{StlWall} = 0.16 \cdot in$ | |

The sum of the areas can be calculated as follows:

$$SUM_{Area} := A_{Concrete} + A_{StlWall}$$

$$SUM_{Area} = 0.693 \cdot in$$

The sum of the areas times the distance to the reference centroid, can be calculated as follows:

$$SUM_{Y\,Area} := A_{Concrete} \cdot Y_{Concrete} + A_{StlWall} \cdot Y_{StlWall}$$

$$SUM_{Yarea} = 1.109 \cdot in^2$$

The distance to the centroid of the overall pipe wall from the middle of the steel pipe wall (the reference position for initially assumed centroid) can be calculated as follows:

$$Y_{PipeWall} := \frac{SUM_{YArea}}{SUM_{Area}}$$

$$Y_{PipeWall} = 1.601 \cdot in$$

The moment of Inertia of the individual layers about their own neutral axis is calculated per unit length as follows:

$$I_{Concrete} := \frac{t_{Con}^3}{12}$$

$$I_{Concrete} = 5.333 \cdot in^3$$

$$I_{StlWall} := \frac{t_{Stl}^3}{12}$$

$$I_{StlWall} = 3.396 \times 10^{-4} \cdot in^3$$

The sum of the EI values for all layers is calculated as follows:

$$EI_{Concrete} := E_{Concrete} \cdot [I_{Concrete} + t_{Con} \cdot (Y_{PipeWall} - Y_{Concrete})^2]$$

$$EI_{Concrete} = 2.501 \times 10^7 \cdot in \cdot lbf$$

$$EI_{StlWall} := E_{Steel} \cdot [I_{StlWall} + t_{Stl} \cdot (Y_{PipeWall} - Y_{StlWall})^2]$$

$$EI_{StlWall} = 1.229 \times 10^7 \cdot in \cdot lbf$$

$$EI_{TotalRipeWall} := EI_{Concrete} + EI_{StlWall}$$

$$EI_{TotalPipeWall} = 3.729 \times 10^7 \cdot in \cdot lbf$$

This the total "EI" value for the pipe wall. This value must be substituted into Equation 5-14 of AWWA Manual M45 to properly calculate overall pipe stiffness.

$$D_{Centroid} := ID_{Pipe} + 2 \cdot t_{Con} + t_{Stl} - 2 \cdot Y_{PipeWall}$$

(Centroid diameter of the pipe.)

$$D_{Centroid} = 88.959 \cdot in$$

Pipe Stiffness, PS, is determined as follows utilizing ASTM D2412, $$PS_{PressureCastSteelPipe} := \frac{EI_{TotalPipeWall}}{\left[0.149 \cdot \left(\frac{D_{Centroid}}{2}\right)^3\right]}$$

$$PS_{PressureCastSteelPipe} = 2.844 \times 10^3 \cdot psi$$

Review of the two pipe stiffness values shows the new pressure cast steel pipe will be much stiffer than conventional steel pipe and much more capable of supporting pipe handling, installation and earth loads $$PS_{ConventionalSteelPipe} = 51.758 \cdot psi$$

Chance in Concrete Height During Pressure Casting:

$$PipeLength := 24 \cdot ft$$

$$DeltaVolume := \frac{\sigma_{SteelCasting}}{E_{Steel}} \cdot \frac{ID_{Steel}}{2} \cdot \pi \cdot ID_{Steel} \cdot PipeLength$$

$$DeltaVolume = 3.989 \cdot ft^3$$

$$DeltaH := \frac{DeltaVolume}{\pi \left[\left(\frac{ID_{Steel}}{2}\right)^2 - \left(\frac{ID_{Pipe}}{2}\right)^2\right]}$$

$$DeltaH = 6.233 \cdot in$$

Drop in height of concrete during the pressure casting operation.

Figure 2:
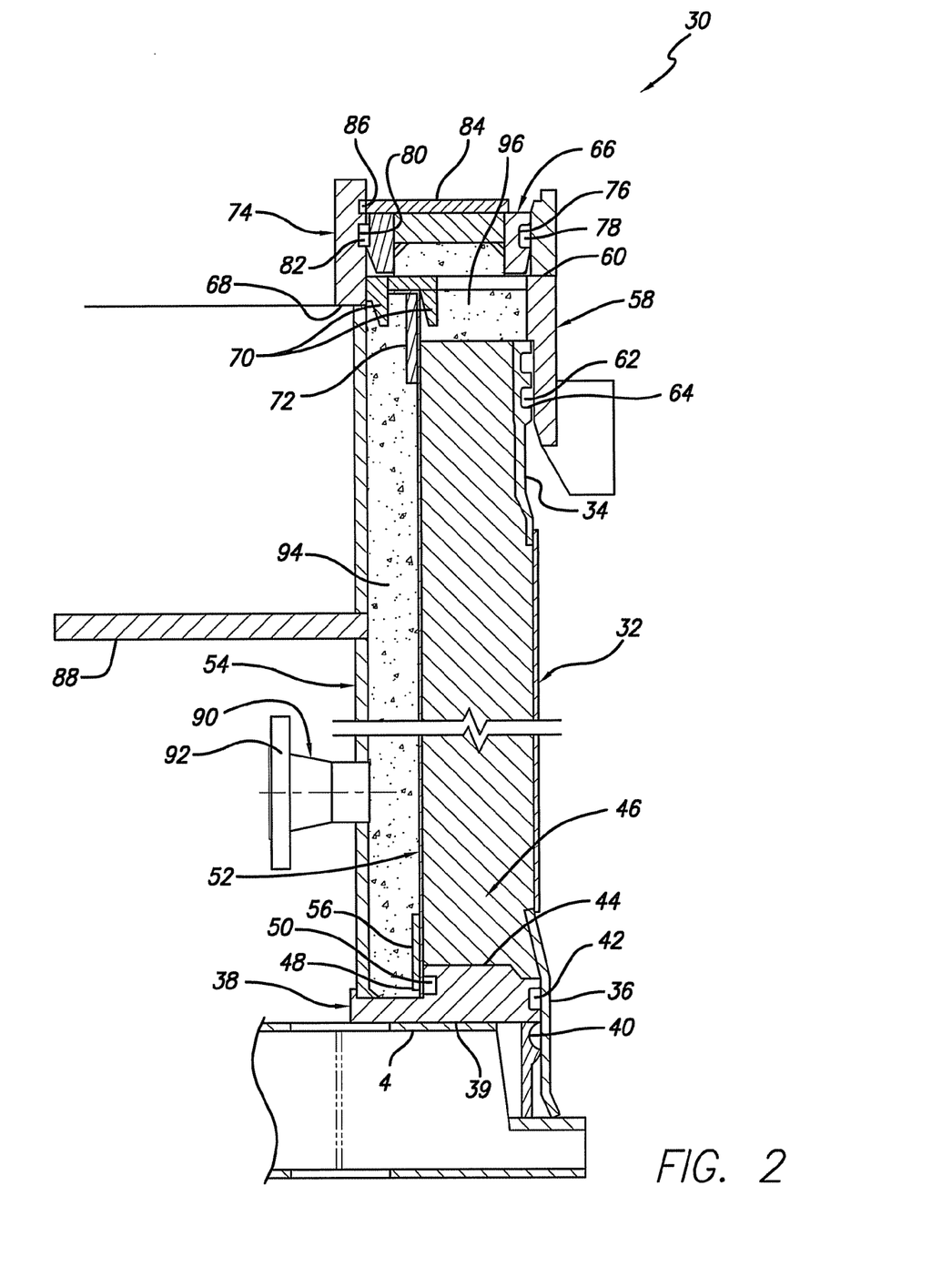
FIG. 2 is a cross-section side view of an example embodiment process that is used to make the pressure-cast steel pipe of FIG. 1.

The PCSPs of this invention can be manufactured using a number of different pressure casting techniques. These techniques can involve horizontal or vertical pressure casting, depending on the particular pressure casting molding system. FIG. 2 illustrates the use of a vertical pressure casting technique and related assembly, wherein the concrete or mortar composition is poured and cast in a vertically oriented mold assembly to form the liner in situ while imposing a desired stressing force on the surrounding metal shell or steel pipe. Once the stressing force is removed, the metal shell places the finally-cured liner of the resulting PCSP in a desired state of compression. In an example embodiment, this example technique involves pressurizing the poured concrete or mortar composition to impose a desired stress on the metal shell through the use of a hydrostatic means, e.g., imposing a pressurized volume or body of fluid such as water into contact with a surface of the concrete or mortar composition.

FIG. 2 illustrates an example assembly 30 useful for making the PCSP in accordance with the principles noted above. In this example embodiment, a cylindrical metal shell 32 is formed with ends 34 and 36 attached thereto to respective ends of the shell as described above. The wall thickness of the metal shell can be within the ranges noted above. In an example embodiment, the metal shell or steel pipe can be made on a drum cylinder machine with the ends 34 and 36 welded thereto. In an example embodiment, the metal shell is formed from X60 steel.

The cylindrical metal shell 32 is positioned over a base ring 38 that is positioned at the base or bottom position of the assembly 30. The base ring 38 comprises a generally annular body 39 that may include one or more grooves 40 extending circumferentially along an outer wall surface of the base ring and positioned adjacent an inside wall surface of shell end 36. The base ring is formed from a structurally rigid material such as a metallic material, and in a preferred embodiment the preferred material is steel.

The one or more grooves 40 are sized and shaped to accommodate placement of one or more respective sealing members 42 therein, wherein the one or more sealing member 42 are sized and shaped to engage and form a seal against an inside diameter of the metal shell end 36. In a preferred embodiment, the base ring comprises a pair of grooves 40 that are spaced axially apart from one another a desired distance along the outer surface, and comprises respective sealing members 42 in the form of annular rings disposed therein. The annular seal rings 42 are preferably formed from an elastomeric material such as rubber or the like capable of providing a sealing engagement with the metal shell end.

The base ring 38 includes an upper or top surface 44 that forms a closed bottom end of an annular concrete or mortar pour cavity or chamber 46. The base ring 38 further includes a groove 48 that is positioned circumferentially along an inside diameter of the ring 38. The groove 48 is positioned, sized and shaped to accommodate placement of a sealing member 50 therein to engage and form a seal with an adjacent outside wall surface of a collapsible inner mold member 52.

The base ring 38 further includes a section that projects radially inwardly from the body 39 away from the base ring inside diameter, and that is connected with a generally cylindrical displacement tube 54, e.g., a bottom end of the displacement tube 54 is thereby mounted on the base ring. As shown in FIG. 2, the collapsible inner mold member 52 is positioned concentrically around an outside diameter of the displacement tube 54. The collapsible inner mold member and displacement tube are each formed from a structurally rigid material, such as a metallic material, and in a preferred embodiment both the collapsible inner mold member and the displacement tube are formed from steel.

The collapsible inner mold member 52 can be formed from a single sheet of material that is rolled into the form of a cylinder or can be formed from a number of panels or sheets that are welded or otherwise joined together to form a cylindrical shape. In an example embodiment, the collapsible inner mold member is provided in the form of a cylindrical sheet having two ends that extend longitudinally along the length of the inner mold member. The ends are configured such that they can be moved inwardly towards one another, e.g., coiled towards one another, to reduce the diameter of the inner mold member and thereby cause the inner mold member to collapse for purposes of facilitating removal of the formed PCSP therefrom.

In an example embodiment, the ends of the collapsible inner mold member are connected to one another by a mechanism that operates to maintain a fixed inner mold member diameter during the pouring a pressurizing operation, and that can be operated to move the ends of the inner mold member together thereby collapsing the mold member to facilitate releasing the mold member from the formed concrete or mortar core, The inner mold member is further configured to minimize leakage of the concrete or mortar composition during pour and formation of the PCSP under pressure. In a preferred embodiment, a gate is placed between the collapsible inner mold member ends that can be remotely actuated to reduce the diameter of the inner mold member at the appropriate stage of the operation, thereby enabling the inner mold member to be removed from the PCSP once formed.

A bottom reinforcing ring 56 is positioned along an inside diameter surface of the collapsible inner mold member 52 adjacent the base ring 38 and assists in promoting a desired sealing engagement between a bottom end section of the collapsible inner mold member and the base ring. The bottom reinforcing ring 56 can be formed from a structurally rigid material and can comprise one or more members that alone or together form an annular support positioned concentrically inwardly of the collapsible inner mold member bottom end section. In an example embodiment, the bottom reinforcing ring is made from steel and is welded to a bottom portion of the inner mold member.

Moving to the top of the assembly 30, an annular top ring 58 is positioned adjacent a top end of the metal shell 32. In an example embodiment, the top ring comprises a cylindrical outer section 60 that is positioned concentrically around the end 34 of the metal shell 32. The outer section 60 has an inside diameter that is sized and shaped to accommodate placement of the end 34 within a lower region of such inside diameter. Sealing members 62 are positioned within one or more respective grooves 64 disposed circumferentially around the end 34 to provide a seal between the top ring 58 and the metal shell 32. The sealing members 62 can be annular members that are made from an elastomeric material such as rubber or the like.

While the embodiment of FIG. 2 illustrates the use of sealing members at the top and bottom of the assembly disposed in grooves that are respectively disposed on the shell end and the base ring, it is to be understood that the specific sealing mechanism used to form a desired seal at the top and base of the concrete or mortar chamber 46 can be other than that which is described and illustrated, and that such variations are understood to be within the scope of this invention.

The inside diameter of the top ring outer section also includes a central region that is sized and configured to accommodate receiving a pressurizing medium therein and to accommodate a desired extra volume of concrete or mortar above the spigot 34. The extra volume provided by the top ring is useful to make up for the volume increase that occurs within the chamber 46 during pressurizing as the outer steel pipe or shell 32 increases in diameter under pressure. The typical volume change during pressurizing results in a loss of about 6 to 7 inches of vertical height for a 4-inch thick concrete liner. The top ring is configured to help accommodate such volume change.

In an example embodiment, the pressurizing medium is water and the central region of the top ring is sized having vertical height to address the concrete or mortar volume change that occurs during pressurization, and having a diameter that is less than that of the top ring bottom region. Sizing the top ring outer section inside diameter in this manner operates to limit the extent that the end 34 is inserted therein during assembly for the process of both pouring the concrete or mortar composition into the assembly 30 and into the chamber 46 and subsequently pressurizing the poured concrete or mortar composition.

The top ring outer section 60 includes an inside diameter top region that is sized and shaped to accommodate placement therein of a top member or pressure top or cap 66 that is placed over a top portion of the assembly 30. In an example embodiment, the inside diameter top region has a diameter sized smaller than that of the central region to control the axial placement of the top member 66 therein, e.g., so that it does not enter the central region.

The top ring 58 also includes an inner section 68. In an example embodiment, this inner section is welded to the top ring 58 by centralizing gussets (not shown). The inner section 68 is positioned radially inwardly from the outer section 60 and radially outwardly a distance from the displacement tube to a position adjacent an upper end of the collapsible inner mold member 52. The inner section 68 includes a pair of downwardly projecting lips or rings 70 that are positioned and sized to accommodate placement of the top end of the collapsible inner mold member 52 therebetween.

In an example embodiment, the collapsible inner mold member 52 fixedly registers with a placement feature of the base ring 38, and at least one of the top ring lips 70 operates to limit the radially outward movement of the collapsible inner mold member. In an example embodiment, the lips 70 and top ring 60 are provided in the form of one assembly. Also, the other of the lips that is not in contact with the collapsible inner mold member is positioned adjacent an outside surface of the displacement tube top section to assist in positioning the top end of the inner mold member 52 concentrically with the end 34 of the metal shell 32.

A top reinforcing ring 72 is positioned along an inside diameter surface of the collapsible inner mold member 52 adjacent the top ring inner section 68, and assists in urging the collapsible mold member 52 against the lip 70. The top reinforcing ring 72 is formed from a structurally rigid material and can comprise one or more members that alone or together form an annular support positioned concentrically inwardly of the collapsible inner mold member top end section. In an example embodiment, the top reinforcing ring 72 is made from steel and is welded to the end of the collapsible inner mold member 52.

The top member or pressure top 66 comprises an annular member positioned radially between the top ring outer section 60, along an outside diameter, and a top section 74 that is attached to an upper end of the displacement tube 54, along an inside diameter. The top section 74 accommodates thrust from the top member 66 produced by internal pressure during the pressurizing operation.

The pressure top 66 includes an outside diameter wall surface that is positioned adjacent the top ring outer section 60 inside diameter top region, and includes a groove 76 extending circumferentially therearound. An annular sealing member 78 is disposed within the groove and can be formed from an elastomeric material to provide a desired seal with the top ring outer section. Alternatively, the top ring inside diameter top region can be configured having the groove to accommodate placement of a sealing member therein.

The pressure top 66 also includes an inside diameter wall surface that is positioned adjacent an outer surface of the displacement tube top section 74, and that is configured to provide sealing engagement therewith. In an example embodiment, the displacement tube top section comprises a groove 80 disposed circumferentially along its outer surface that is sized to accommodate placement of an annular sealing member 82 therein, wherein the sealing member can be formed from an elastomeric material such as that described above for the other sealing members used in this assembly 30.

A locking member 84, is positioned on top of the pressure top 66 and is configured to removably fix placement of the pressure top 66 onto the top ring 58 to close and lock the mold assembly into place. In an example embodiment, the locking member 84 is provided in the form of a snap ring or the like that is sized having an inner diameter edge that is capable of registering with a groove 86 disposed along an outer diameter of the displacement tube top section 74. The locking member engages the groove 86 to resist the pressure thrust on the top member 66 during the pressure casting operation.

The displacement tube 54 is a generally cylindrical member that extends from the top section 74 downwardly to the base ring 38, and that may include one or more ribs 88. The one or more ribs operate to stabilize the displacement tube from collapse caused by the external pressure applied to the mold assembly during the pressure casting operation, and may extend between diametrically opposed portions of the tube and/or to a centrically located mounting hub or the like (not shown) again for purposes of stabilizing placement and minimizing radial movement or deflection of the displacement tube during the process of forming the PCSP.

The displacement tube 54 includes an inlet 90 positioned through a tube wall to facilitate the transport of the pressurizing medium, e.g., water, into the assembly. The inlet includes a leak tight connection end 92 for purposes of facilitating attachment of the same to a conventional pressurizing medium delivery device, such as a water delivery pipe. In a preferred embodiment, the inlet 90 is positioned near the bottom of displacement tube 54 and is configured to accept delivery of pressurized water from a suitable pressurizing device such as from a discharge end of a pump or the like.

The above-described assembly 30 is operated in the following manner to form a PCSP. Before placement of the pressure top 66 and locking member 84 over the top portion of the assembly, a desired volume of concrete or mortar composition is poured or otherwise delivered into the chamber 46 formed between the metal shell 32 and the collapsible inner mold member 52.

In an example embodiment, the concrete or mortar composition comprises a mixture having the following characteristics. One desired characteristic is that the concrete or mortar be self leveling, so it acts like a liquid. This is desired so the concrete or mortar will transfer the pressure applied to its surface from the top of the pipe to the bottom of the pipe and radially outward to expand the steel pipe. A second characteristic is that the concrete or mortar may be expansive. The use of an expansive mix helps to minimize and/or eliminate undesired volume loss from creep and drying shrinkage to help maintain the desired stress on the pipe wall during operation.

In a preferred embodiment, the prestress of the concrete core will be very small or eliminated as the internal pressure reaches operating pressure. Maximum tensile strain in the concrete core will be limited to assure the concrete core is in contact with the inside diameter of the metal shell or only a very small annual gap exists between the concrete core and the inside diameter of the metal shell. Such contact or close proximity will help ensure that the concrete core provides the high alkaline environment needed to protect the steel from corrosion for a period of approximately 50 years. In a preferred embodiment, the steel will carry the loads from pressure, without using any of the available steel stress for earth loads or reaction to the concrete or mortar core. The core and adjacent backfill support will provide the stiffness needed to support the external loads from soil weight, pipe weight and water weight. In an example embodiment, the concrete or mortar composition is self leveling with limited shrinkage, and is unreinforced, e.g., does not include any rebar or other metal reinforcing members disposed therein.

The volume of concrete or mortar composition that is used for making PCSP in this manner can vary depending on such factors as PCSP length, and the desired concrete liner thickness. The concrete or mortar composition is delivered into the chamber 46 until the top surface of the pour extends into the top edge of the end 34. In an example embodiment, the concrete or mortar composition is delivered into the mold such that its surface extends a distance into the top ring 58. As noted above, the top ring 58 operates to provide an extra volume of concrete or mortar useful for addressing the downward movement of the concrete or mortar surface level within the mold during pressurization due to the outward expansion of the steel shell. In an example embodiment, the volume of concrete or mortar disposed above the end 34 is sufficient to make up for the vertical height change during pressurizing such that the final level of the concrete is just at the top of the end 34. The equations presented above provide an example calculation of the vertical drop in concrete height during the pressure casting process.

Once the concrete composition is poured into the chamber 46, and before it is allowed to cure, the pressure top 66 and the locking member 84 are loaded into place over the top of the assembly. Water is then directed into the mold assembly through the water inlet 90 under a desired operating pressure. The water flows into the assembly, filling an annular water chamber 94 formed between the displacement tube 54 and the collapsible inner mold member 52. The water also moves to the top of the assembly filling an upper chamber 96 of the assembly that is disposed above the surface of the concrete or mortar composition, and that is defined generally within the central region of the top ring. The water within the assembly has the same pressure within the chambers 94 and 96, thereby operating to impose a desired stressing force onto the concrete or mortar composition while at the same time supporting the radial placement position of the collapsible core within the assembly, e.g., equal pressures are exerted on both sides of the collapsible inner mold member operating to maintain its radial position within the assembly.

The pressure of the water within the assembly is maintained at a constant level for a desired period of time during the casting and curing of the concrete or mortar composition. The use of water as the pressurizing medium allows for makeup water to be supplied as needed, during the pressurizing process to address any leakage that may occur at the various sealing rings, without the fear of causing a pump failure, i.e., water will not cure in the pressurizing pump as would occur if pressure was maintained by a concrete or grout pressure pump. The exact amount of time that the concrete or mortar composition is pressurized will vary depending on the particular pipe design and/or performance criteria, the type of concrete composition used, as well as the particular end-use application.

PCSPs, and methods for making the same, according to principles of this invention can be better understood with reference to the following example.

EXAMPLE a PCSP was formed using the assembly illustrated in FIG. 2, having an metal shell inside diameter of approximately 92 inches, by delivering a concrete composition comprising approximately 750 lbs cement (Type I/II), 1490 lbs coarse aggregate, 1400 lbs sand, 319 lbs water, 60 fl oz high range water reducing admixture (Glenium 7700), 10 fl oz viscosity-modifying admixture (VMA 538), and comprising a small amount of air voids (2.5%), wherein the total weight of the composition was approximately 3959 lbs. If desired, a portion (15 to 20 percent by weight) of the cement component disclosed in the above composition can be replaced by an expansive agent, such as Komponent from CTS Cement Manufacturing Corp, to compensate for the shrinkage due to drying and creep. This composition was delivered into the concrete or mortar mold chamber. The collapsible inner mold member is positioned so that the inside diameter of the resulting cured concrete liner is approximately 84 inches. The metal shell was provided in the form of a steel shell having a wall thickness of approximately 0.16 inches. The desired concrete liner wall thickness for this PCSP was approximately 4 inches. After the concrete composition was delivered into the mold chamber, water was introduced into the mold assembly such that it covered the surface of the concrete composition. The water in the assembly was pressurized to a pressure that produced a stress in the steel of approximately 90% of specified minimum yield strength (SMYS). In this case, the steel is X60 with a minimum yield of 60,000 psi, so the internal pressure required to produce 54,000 psi is approximately 188 psi. Note in the example given, the D/t ratio is 92/0.16=575, which is beyond the conventional practice in water pipe design and is only possible due to the thicker concrete liner capable of supporting the external earth loads. The water pressure was maintained at this level for approximately 24 hours, imposing a stress on the steel pipe of approximately 54,000 psi causing it to expand. After 24 hours of elevated temperature cure, e.g., at between 140 to 160° F., the collapsible inside mold member was moved into its retracted position and the water pressure within the assembly was relieved, causing the steel pipe to retract onto the concrete core placing it into compression. The resulting PCSP was removed from the assembly, and the PCSP was allowed to continue curing under ambient pressure conditions. Immediately after the initial elevated temperature cure, the concrete core of the PCSP was under a compressive stress of approximately 1659 psi. See the series of equations presented above that provide an example calculation.

A feature of making PCSPs in the manner described is the use of water as the pressuring medium rather than using the concrete itself or grout as the pressurizing medium. A disadvantage of using the concrete composition or grout as the pressuring medium is the damage that can occur to a pressuring device, such as a pump or the like, due both to the inherently abrasive nature of the concrete composition as well as the change in rheologic characteristics that are known to occur over time as the composition cures, making the task of maintaining a desired constant pressure force even more challenging.

The use of water as a pressuring medium for pressurizing the concrete or mortar composition avoids these issues and enables imposing a constant pressure onto the concrete composition in a manner that is relatively easy to do using conventional pumping equipment, and in a manner that is not affected by the curing of the concrete composition. Further, since the concrete composition is self leveling it will largely act like water and transfer the pressure applied to the surface of the composition in the mold to the metal shell. This transferred pressure causes the metal shell to grow in diameter as it would under a normal hydrotest pressure. If during the pressuring process any minor leakage occurs at any of the sealing surfaces, the water pressuring device, e.g., a pumping device, can easily make up for the loss to keep the metal shell stretched. Because the concrete or mortar composition can cure under water, the water pressure cap allows for the composition to cure while also maintaining a desired pressuring force via makeup water should there be any leakage of the concrete or mortar composition.

Once the concrete or mortar core has been subjected to a desired pressure for a desired duration of time, the pressure is removed by releasing the water from the assembly, causing the metal shell to shrink onto the cured concrete liner or core, thereby prestressing the core by placing it into compression. Once this occurs, the inside diameter of the concrete or mortar liner is also reduced, causing it to be clamped onto the collapsible core, thus the need for using an internal core member that is collapsible to facilitate its removal from the now formed PCSP pipe. In a preferred embodiment, once the PCSP has been pressurized for a desired duration, the collapsible inner mold member is first collapsed prior to releasing the pressure within the assembly so as to avoid damaging the inner mold member by the clamping force of the core, and to facilitate or ease the process of collapsing or otherwise reducing the diameter of the inner mold member.

In an example embodiment, the mold assembly is configured so that the water pressure within chambers 94 and 96 are the same, e.g., the chambers are configured such that the water pressure within the chambers 94 and 96 are in fluid flow connection with one another. In the example embodiment illustrated in FIG. 2, the pressurizing water will flow from the chamber 94 to the chamber 96 across the lips or centering rings 70 due to no seal. If desired, grooves and/or holes can be provided to augment the desired passage of water between the chambers 94 and 96.

Once the inner mold member is collapsed, and the pressure is released, then the pressure top 66 is removed and the remaining elements of the molding/pressurizing assembly are then disassembled. The PCSP can be removed from the base ring 38. The removed PCSP can be transported to a desired location for further curing of the concrete or mortar liner under ambient pressure and in a hydrating environment, e.g., where is can be subjected to water as needed to facilitate further curing. In an example embodiment, the concrete composition may be vertically cast and subjected to a pressuring force of approximately 188 psi for a period of approximately 24 hours, after which time the pressure is released and the PCSP pipe is removed to facilitate further ambient pressure curing over a period of approximately twenty-eight days. In an example embodiment, the PCSP can be steam cured during the first 24 hours while maintaining the casting pressure inside the mold. The 24 hours of steam cure can get the PCSP to the equivalent of a 7-day ambient cure level that is normally 80% of the strength at 28-days. The elevated temperature steam cure accelerates the curing rate, allowing the PCSP to be removed from the pressure casting assembly quicker, thereby improving the manufacturing rate of making additional PCSP.

Figure 3:
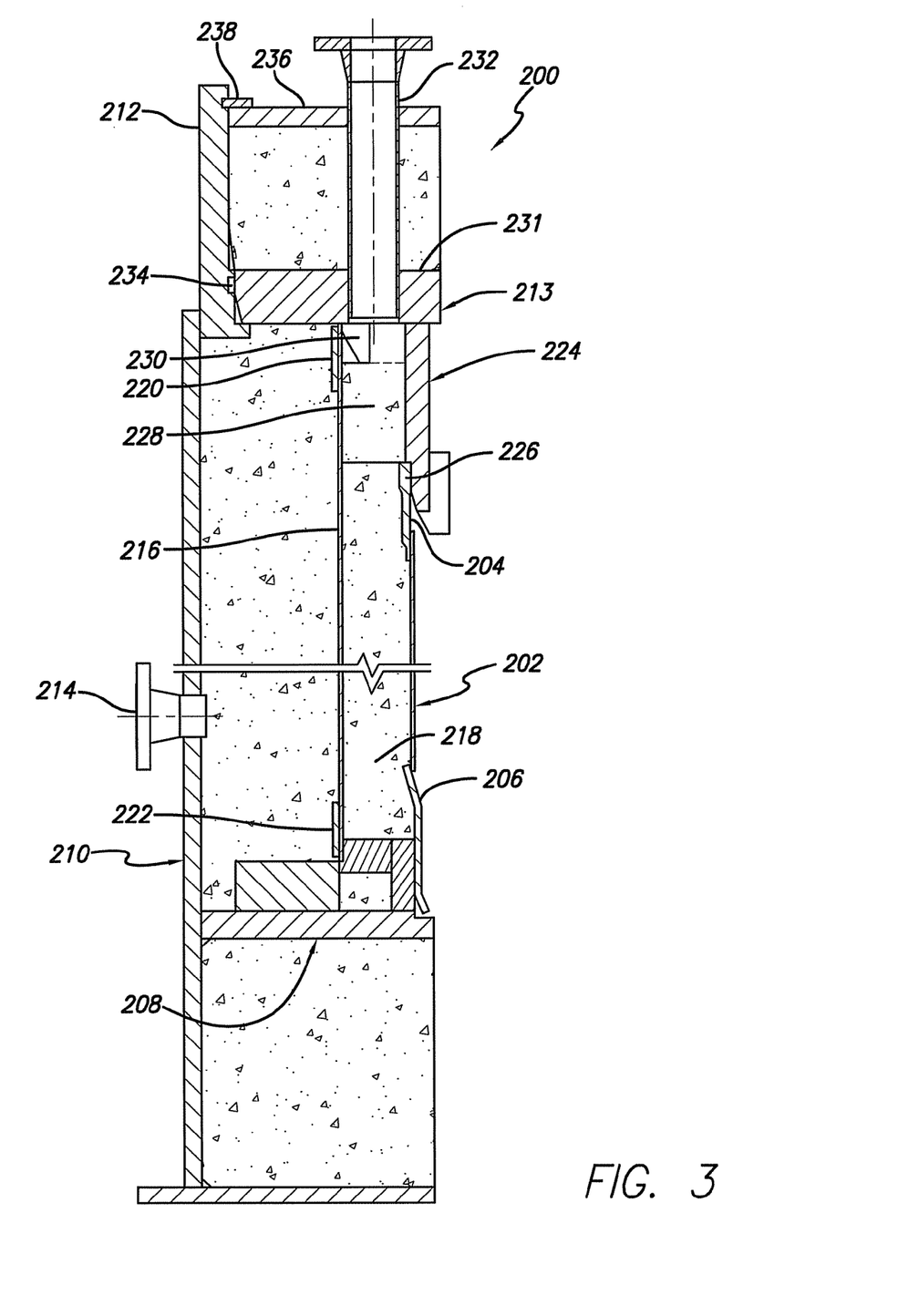
FIG. 3 is a cross-section side view of another example embodiment process that is used to make the pressure-cast steel pipe of FIG. 1.

FIG. 3 illustrates another example assembly 200 useful for making the PCSP in accordance with the principles noted above, that is somewhat similar to that disclosed above and illustrated in FIG. 2 in that it makes use of a collapsible inner mold member and a water pressurizing medium to pressure cast and form the PCSP. Generally, the assembly males use of a cylindrical metal shell 202 comprising ends 204 and 206 and that defines an exterior surface of the resulting PCSP. The assembly 200 includes an annular base ring 208 that is positioned at a bottom portion of the assembly and that is in sealed contact with an inside surface of the end 206. The base ring can be configured in generally the same manner as the base ring described above used in the assembly illustrated in FIG. 2.

A generally cylindrical displacement tube 210 is positioned concentrically inwardly of the metal shell 202 and extends longitudinally upwardly from the base ring 208 to an upper ring of the displacement tube 212 that is in contact with a top cap assembly 213 positioned at an upper section of the assembly 200. The displacement tube is generally configured in the same manner as described above for the assembly of FIG. 2, and includes a water inlet 214 extending through a wall portion for receiving pressurizing water into the assembly.

A collapsible inner mold member 216 is radially interposed between the metal shell 202 and the displacement tube 210. The collapsible inner mold member is configured in the same manner as described above for the assembly illustrated in FIG. 2, and is provided to form together with the metal shell a mold chamber or cavity 218 for receiving and casting a concrete or mortar composition therein. Upper and lower reinforcing rings or bands 220 and 222 are used to keep the collapsible inner mold member in a desired radial position.

A top ring 224 is fixed to the top cap assembly 213 and is positioned over end 204 of the metal shell, and an annular sealing member 226 can be used to form a desired seal between the end and the top ring. The top ring 224 includes an inside diameter that, together with an outside diameter section of the collapsible inner mold member, forms a pouring cavity 228 therein. The top ring 224 includes at least one lip or ring 230 projecting downwardly to register with an outside surface of the collapsible inner mold member 216 to limit its radial movement during the pressure casting process.

The top ring section 212 is attached to an upper end of displacement tube 210. The top cap assembly 213 is positioned over the top ring section 212 of the displacement tube 210. The top cap assembly 213 includes a fill tube 232 that passes through an opening that extends through an upper annular ring 236 and a lower annular ring 231 of the top cap assembly 213 to facilitate the delivery of the concrete or mortar composition into the pouring cavity 218 and 228 before pressurization. The fill tube 232 can include a watertight connection end to accept attachment with a suitable concrete or mortar delivery device, such as piping or the like. In an example embodiment, the fill tube 232 has a diameter of about 4 inches, to facilitate the pumping or pouring of the concrete or mortar composition therethrough. In an example embodiment, the top cap assembly 213 and the top ring 224 are combined as a welded together element at the lower annular ring 231.

The top cap assembly 213 is made up of an upper annular ring 236 and a lower annular ring 231 that are spaced apart and fixed together by gusset plates. The top cap assembly 213 is placed into sealed contact at annular seals 234 and 226. The top cap assembly is held in place by the use of a locking member 238, such as a snap ring and the like. In an example embodiment, the locking member 238 is a snap ring that is placed into locked position by engagement within a groove disposed along an adjacent surface of the end ring 212 attached to the displacement tube 210.

The materials used to form all of the elements noted above for the assembly 200 can be the same as those used to form the same elements noted above for the assembly 30 illustrated in FIG. 2.

Configured in this manner, the assembly 200 is operated in the following manner to form PCSP. When compared to the assembly of FIG. 2, the assembly illustrated in FIG. 3 permits for the top cap assembly 213 to be placed and locked into position prior to delivering the concrete or mortar composition into the assembly. A desired volume of concrete or mortar composition is then delivered, e.g., poured or pumped, into the assembly by way of the fill tube, filling the chamber 218 and at least a portion of the chamber 228.

As shown in FIG. 3, and as explained above for the assembly illustrated in FIG. 2, the concrete or mortar composition fill level is a desired distance above the end 204 to account for the drop in concrete surface level during pressurization, due to the outward expansion of the metal shell. In an example embodiment, the assembly 200 can include another tube that is positioned approximately 180 degrees from the fill tube, and that can be used as an observation tube for determining when the desired concrete surface level is reached. If desired, a float or the like can be placed in the observation tube to facilitate accurate fill level determination.

Once the concrete or mortar composition has been delivered, the fill tube is closed off and water is directed into the assembly through the inlet 214 at a desired pressure. The pressurized water fills the annular space between the displacement tube 210 and the collapsible inner mold member 216, and then passes over the top edge of the collapsible inner mold member and enters the pour cavity 228 where it operates to pressurize the concrete or mortar composition. The water pressure operates to impose a desired stressing pressure on the concrete or mortar composition that transmits the same to the metal shell in the same manner described above for the assembly illustrated in FIG. 2.

Figure 4:
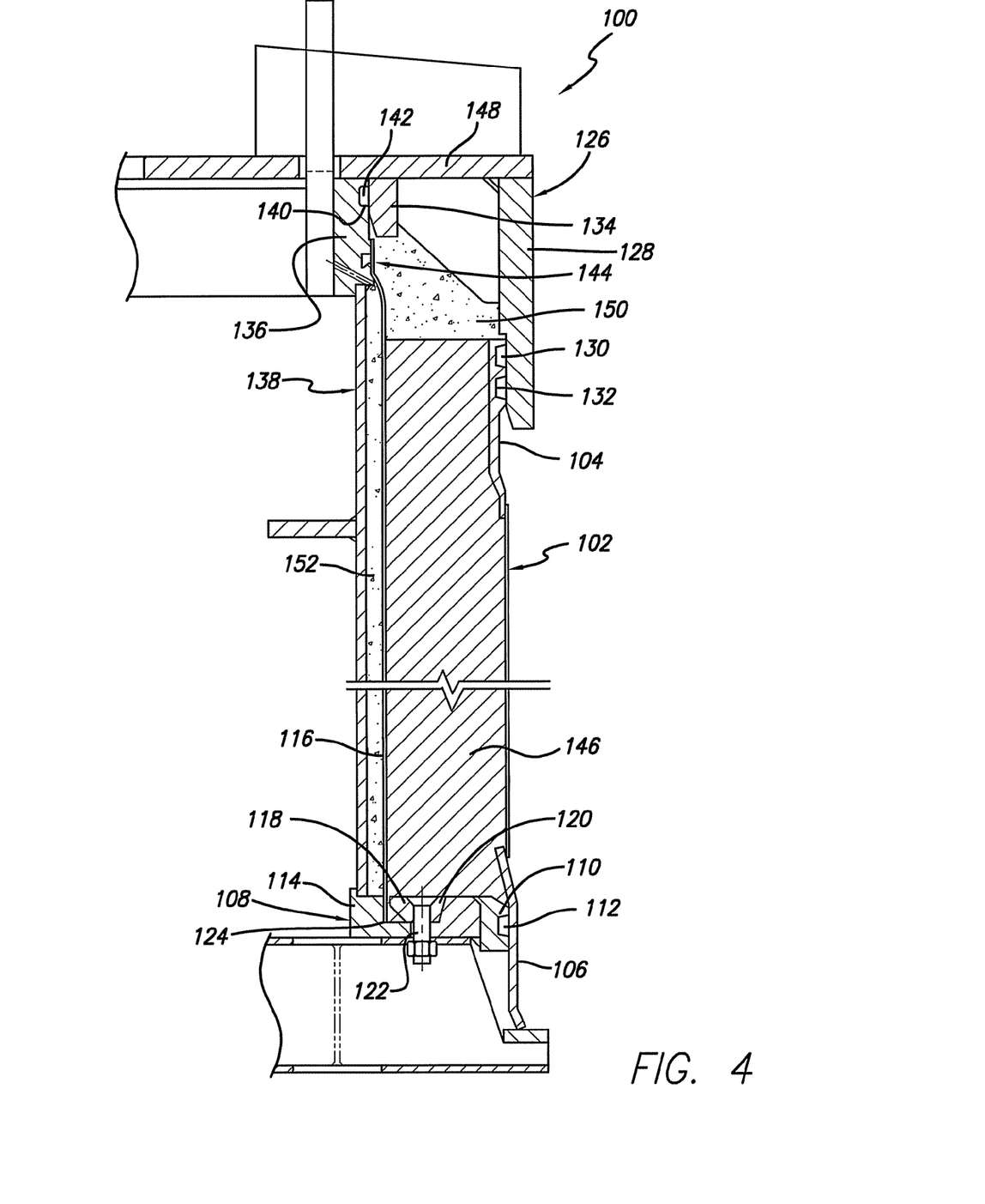
FIG. 4 is a cross-section side view of another example embodiment process that is used to make the pressure-cast steel pipe of FIG. 1.

FIG. 4 illustrates another example assembly 100 useful for making the PCSP in accordance with the principles noted above. Unlike the example assembly illustrated in FIGS. 2 and 3, that make use of a collapsible inner mold, the assembly embodiment illustrated in FIG. 4 males use of a wall member, e.g., a bladder, a fiberglass pipe or the like, that is capable of being used to both form the inside diameter of the concrete liner during the pouring and pressure casting process, and that is removable from the concrete liner once the PCSP is formed by removing the initial expansion pressure in chamber 152.

The assembly 100 makes use of a metal shell 102 and ends 104 and 106 that are attached at opposed respective top and bottom shell ends. The shell and ends can be the same as that disclosed above and illustrated in FIGS. 2 and 3. An annular base ring 108 is positioned at the bottom of the assembly 100 and comprises a groove 110 positioned circumferentially along an outside diameter that is sized and shaped to accommodate a sealing member 112 therein for forming a seal with an inside surface of the end 106. The base ring also includes an inside diameter section 114 that is configured to accommodate placement of a displacement tube bottom end therein.

The base ring 108 further includes a mechanism for engaging and forming a seal with a wall member 116. In an example embodiment, the mechanism is provided in the form of a seal ring 118 that is configured to fit within a groove 120 disposed along a top surface of the ring and that is removably attachable to the ring by a threaded attachment means 122. The seal ring is configured to engage an end portion of the wall member, attaching and sealing it to the base ring. A sealing member 124 may be used if necessary to ensure a desired seal between the wall member and the base ring.

Moving to the top of the assembly 100, a top ring 126 comprises an outer section 128 that is positioned over a portion of the end 104, and one or more annular sealing members 130 are positioned within respective grooves 132 disposed circumferentially around the end 104 to provide a seal with the outer section 128. The top ring 126 includes an inner section 134 that is positioned against a top section 136 that is connected to the displacement tube 138. The displacement tube extends longitudinally between the base ring and the top section and is positioned concentrically inwardly of the wall member 116. The top section 136 includes a groove 140 having an annular sealing member 142 disposed therein that provides a desired seal with the top ring inner section 134.

The wall member 116 is attached to the top section by a suitable attachment mechanism 144, depending on the type of material that is selected for use as the wall member. In the event that the wall member is provided in the form of an elastomeric bladder, the attachment mechanism used to attach the same to the top section can be a signode strap or the like. It is to be understood that the exact type and/or configuration of the attachment mechanism used to attach the wall member 116 to the top section and base ring can and will vary depending on the type of material and/or structure that is used to form the same. For example, in the event that the wall member 116 is provided in the form of a rigid but expandable material such as a fiberglass pipe or the like, the attachment mechanisms may be different from those already described. However, the function of the same is generally to both facilitate attachment of the wall member ends to the respective top section and ring member, and also do so in a manner that minimizes and or eliminates any unwanted leakage of material on either side of the wall member.

In an example embodiment, a top seal cap 148 is welded to the top ring 128 to seal off the mold assembly. In such an example embodiment, the top seal cap 148 includes a fill tube (as shown in the assembly illustrated in FIG. 3) that extends through the cap 148 for delivering a desired volume of the concrete or mortar composition into the assembly.

The assembly 100 illustrated in FIG. 4 is used to form a PCSP in the following manner. Once a desired volume of the concrete or mortar composition is poured, pumped or otherwise delivered into the mold cavity or chamber 146 to a desired level within a water chamber 150 (as noted above to address the drop in concrete surface level during pressurization) and the concrete or mortar fill source is sealed off, pressurized water is introduced into the assembly 100 so that it covers the surface of the poured concrete or mortar composition and fills the water chamber 150 disposed within the top ring 128.

In one embodiment of the assembly 100, the wall member 116 is a passive member such as an elastomeric bladder or the like and the assembly comprises an annular chamber or cavity 152 that is filled with a desired volume of fluid such as water. As the water pressure in the mold chamber 150 is increased to a desired level, the water pressure in the annular cavity 152 increases by passive reaction directly onto the displacement tube. No real force is exerted to the wall member itself in this embodiment since the fluid in the bladder, i.e., water is incompressible.

In another embodiment of the assembly 100, the wall member 116 is an active member such as a fiberglass pipe that has been positioned concentrically around the displacement tube. In this embodiment, prior to casting the concrete core, the annular chamber or cavity 152 existing between the displacement tube and the pipe is pressurized by a fluid such as water, and the pipe is expanded under pressure. The pressuring fluid within the cavity 152 is sealed off, and pressurized water is introduced into the mold chamber 150 as described above to pressure cast the concrete or mortar liner.

The water pressure that is used to pressure cast the concrete or mortar composition in this embodiment as well as the duration of the pressure casting process can be the same as that described above for the assemblies illustrated in FIGS. 2 and 3. During this pressure casting process, the water pressurizes the concrete or mortar composition, which pressure is transmitted to the metal shell causing the shell to be stressed and extend outwardly a desired amount.

Once the designated duration of time has passed, the water pressure within the mold chamber 150 is released, causing the metal shell to contract on the cured concrete or mortar liner placing it into a compressed condition, and causing the inside diameter of the concrete or mortar liner to decrease. The fluid in the annular chamber 152 of both embodiments noted above is then released therefrom, causing the bladder in one embodiment and the fiberglass pipe in the other embodiment to contract and free itself from the inside diameter of the cured concrete or mortar liner, thereby enabling removal of the so-formed PCSP from the assembly. The assembly elements are then disassembled and the resulting PCSP can be removed as described above for the assembly embodiments illustrated in FIGS. 2 and 3.

Generally speaking, PCSPs constructed in the manner described above are pressure cast using the assemblies and according to the process methods noted above for a period of approximately 1 day or 24 hours, allowing the concrete or mortar composition to set and initially cure. The concrete or mortar compositions used to form PCSPs of this invention can include a desired amount of an expansive additive or agent for the purpose of achieving an increased and/or continued amount of prestress as the PCSP continues to cure during and after it has been pressure cast. The use of an expansive additive can also make up for curing and drying shrinkage that occurs during the cure of the concrete or mortar core and for creep in the concrete or mortar caused by the compressive stress applied to the concrete liner from the steel cylinder. The use of the expansive additive can help to maintain the maximum prestress on the concrete core and metal shell relative to the pressurized stress in the metal shell during the pressure casting process and curing stages.

In an example embodiment, it may not be possible or desirable to pressure cast above approximately 90% of SMYS. The release of pressure during the pressure cast process reduces the steel stress in the PCSP to a value substantially below 90% of SMYS. At this point, the presence of an expansive agent in the concrete or mortar composition can apply more stress to the steel to offset the losses from creep and shrinkage, without over stressing the steel. It is desired that the expansive agents used for this purpose have a delay time from initial concrete cure that allows the concrete to set sufficiently to resist the steel prestressing and then later (after the pressure is removed and the pipe removed from the mold assembly) the expansive concrete adds to the steel prestress without taking the steel beyond the design yield. The creep and drying shrinkage also occur after the pipe is removed from the pressure casting mold, so these two opposing effects offset each other after the pipe is pressure cast.

Suitable expansive agents useful for this purpose include those available under the product name Komponent from CTS Cement Manufacturing Corp, to compensate the shrinkage due to drying and creep. In an example embodiment, the expansive agent can comprise up to about 15 or 20 percent by weight of the cement component used in the concrete composition. It is to be understood that any optional use of an expansive agent and the amount of any such use can and will vary depending on a number of factors such as the materials used to form the pipe, the engineering design criteria and performance parameters, and the end-use application.

In an example embodiment, the casting pressure is set to 90% of SMYS during cure. The initial prestressing of the concrete core is reduced by cure shrinkage of the concrete, drying shrinkage of the concrete plus creep in the concrete liner and steel pipe. These losses are such that the full design stress possible for the steel cylinder cannot be reached without removing all the prestress placed onto the concrete liner and either placing the concrete liner into tension or introducing the possibility of a deleterious annular gap between the concrete liner and steel pipe during operation. Note that small annular gaps or tension in the concrete is acceptable and proven in concrete and steel pipe such as AWWA C300 pipe, but excess strain in the steel shell must be avoided. The concrete liner could be anchored to the steel pipe to prevent this annular gap, thus placing the concrete liner in tension during operation. All of these variants are possible and may be desirable for specific applications.

In a preferred embodiment, the concrete or mortar liner is under very small prestress from the steel cylinder at operating pressures or the steel cylinder is expanded a very limited amount above the free diameter of the concrete or mortar core at operating pressures. This allows all the allowable design stress in the steel pipe to be used for resisting internal pressure, while the liner and adjacent backfill support can be used to resist the buried earth loads plus pipe and water weight. The amount of expansive agent required to achieve the preferred embodiment will depend on the casting pressure, the creep factors, the shrinkage factors and the desired operating stress in the steel pipe. The full design of the pipe includes recoverable drying shrinkage. About 70% of the drying shrinkage is reversible when the pipe is flooded with water and the concrete liner is allowed to reabsorb the lost water during drying. This re-swelling of the concrete can be used as part of the net prestressing of the concrete liner, including all the various losses and gains associated with the initial casting pressure, the drying and cure shrinkage, the expansion of the concrete from the expansive agent plus the creep in the steel and concrete liner under sustained load.

A feature of PCSPs constructed in the manner noted above is that they comprise a concrete or mortar liner that is capable of providing a degree of corrosion resistance that meets that currently provided by PCCP, reinforced concrete steel cylinder pipe, and conventionally designed mortar lined steel pipe, e.g., on the order of 50 years. Further, such PCSPs comprise a metal shell that places the concrete liner in a compressed condition, and that does so in a manner that is more robust and not prone to sudden failure when compared to PCCP, e.g., by the corrosion and breakage of tensioning wires. Further, the metal shell can be easily coated with a suitable polymer material or the like that is capable of providing a desired degree of dielectric protection/resistance from the unwanted effects of a corrosive environment or cathodic interference. Further, the metal shell can be easily repaired by welded patch or the like, should a corroded section be identified, without having to remove the pipe from service and/or without having to remove the pipe from its buried location.

Still further, PCSPs constructed in the manner noted above can be formed in a single step of pressure molding, where the concrete liner is formed in situ as the prestressing force is imposed onto the metal shell that subsequently operates to place the concrete in a compressed condition, thereby avoiding multiple steps resulting in saved time and labor. Still further, PCSPs constructed in the manner noted using water as the pressuring medium above avoid the possibility of pump failure during the pressuring process that could result in a scrapped part, lost material and labor cost and reduced manufacturing efficiency.

Still further, PCSPs constructed according to principles of the invention provide a pipe structure that is very stiff during transport and installation. In conventional concrete mortar lined steel pipe, the pipe is so flexible that stulling, wooden or metal supports inside the pipe, is needed to prevent the pipe from excessive flexing, collapsing and or breaking the liner. The thicker liner with the compression applied to the liner from the steel associated with the PCSP males the pipe very robust for transport and burial without the stulling, which provides a further reduced expense when compared to conventional concrete lined steel pipe. The equations presented above provide an example comparison of the pipe stiffness of conventional steel pipe versus pressure cast steel pipe.

Other modifications and variations of PCSP constructions, and methods and assemblies for making the same, according to the principles of this invention will be apparent to those skilled in the art. It is, therefore, to be understood that within the scope of the appended claims this invention may be practiced otherwise than as specifically described.

What is claimed is:

1. A pressure cast lined steel pipe that is placed into fluid transport service, the pipe comprising:
    an annular concrete or mortar liner forming an inside diameter of the pipe;
    a metal shell surrounding the liner;
    wherein the liner is in direct contact with an inside wall surface of the metal shell, wherein the liner is in a prestressed state by the metal shell in an initial state prior to the pipe being placed into fluid transport service, and wherein the prestress of the liner in a final state when placed into fluid transport service is essentially eliminated.

2. The pipe as recited in claim 1 wherein the ratio of the wall thickness between the liner and the metal shell is in the range of from about 5:1 to 80:1.

3. The pipe as recited in claim 1 wherein the ratio of the wall thickness between the liner and the metal shell is in the range of from about 10:1 to 50:1.

4. The pipe as recited in claim 1 wherein the wall thickness of the metal shell is in the range of from about 0.06 to 0.75 inches, and the wall thickness of the liner is in the range of from about 1.5 to 10 inches.

5. The pipe as recited in claim 1 further comprising a coating of dielectric material disposed along an outside surface of the metal shell.

6. The pipe as recited in claim 1 wherein the concrete liner is formed in situ while an uncured concrete or mortar composition and the metal shell is pressurized by direct contact between uncured concrete or mortar composition and a fluid pressurizing medium to place the liner into a state of compression when the liner is cured and the pressure is released.

7. The pipe as recited in claim 1 wherein the metal shell has a wall thickness of about 0.06 to 0.75 inches, and wherein the liner has a wall thickness that is about 10 to 50 times that of the shell wall thickness.

8. A pressure cast lined steel pipe comprising:
    an annular concrete or mortar liner forming an inside diameter of the pipe;
    a metal shell surrounding the liner and having a wall thickness of about 0.06 to 0.75 inches;
    wherein the liner has a wall thickness that is about 10 to 50 times that of the shell wall thickness, wherein the liner is in direct contact with an inside wall surface of the metal shell, and wherein the liner is cured in situ against the metal shell by direct contact with a fluid pressuring medium to place the cured liner in a state of compression by the metal shell.

9. The pipe as recited in claim 8 wherein when the pipe is in an initial state that is not placed into fluid transport service the liner is in a prestressed condition, and wherein when the pipe is in a final state that is placed into fluid transport service the prestress on the liner is essentially eliminated.

10. A method for making a pressure cast lined steel pipe comprising the steps of:
    delivering a volume of a concrete or mortar composition into a mold formed between a metal shell along an outside diameter and a movable core member along an inside diameter;
    subjecting the composition to a pressure force to expand the metal shell, wherein the pressure force is provided by a pressurized fluid that is in direct contact with a surface of the composition;
    releasing the pressure force after the concrete or mortar composition has achieved a degree of cure to form a concrete or mortar liner, wherein the step of releasing causes the metal shell to impose a compression force onto the liner; and
    removing the movable core member from an inside diameter of the liner.

11. The method as recited in claim 10 wherein the pressurized fluid is water.

12. The method as recited in claim 10 wherein the movable core member is provided in the form of an elastomeric member.

13. The method as recited in claim 10 wherein the movable core member is provided in the form of a collapsible rigid member.

14. The method as recited in claim 10 wherein the movable core member is provided in the form of a cylindrical rigid structure that can expand to permit formation of the liner and contract to permit removal of the core after pressure casting.

15. The method as recited in claim 10 wherein the movable core member is provided in the form of a high strength steel tube.

16. The method as recited in claim 10 wherein the movable core member is selected from the group of materials consisting of fiber-reinforced resin pipe, plastic pipe, and combinations thereof.

17. The method as recited in claim 10 wherein the concrete or mortar composition includes an expansive agent that with the metal shell contributes to impose a compressive force onto the liner.

18. The method as recited in claim 10 wherein the mold comprises an annular chamber that is oriented vertically.

19. A pressure cast lined steel pipe made according to the method recited in claim 10 wherein the concrete or mortar liner is in direct contact with an inside wall surface of the metal shell.

20. A pressure cast lined steel pipe made according to the method recited in claim 10 wherein the concrete or mortar liner has a wall thickness that is about 10 to 50 times the wall thickness of the steel shell.

21. The method as recited in claim 10 wherein when the pipe is in an initial state that is not placed into fluid transport service the liner is in a prestressed condition, and wherein when the pipe is in a final state that placed into fluid transport service the prestress on the liner is essentially eliminated.

22. A pressure cast assembly for making a lined steel pipe comprising:
    a cylindrical metal shell defining an outer portion of the pipe;
    a base member operatively connected with a bottom portion of the metal shell;
    a top member operatively connected with a top portion of the metal shell;
    an inner mold member positioned concentrically inwardly of the metal shell;
    an annular chamber formed between the metal shell and inner mold member for accommodating a volume of a concrete or mortar composition therein; and
    means for introducing a fluid pressurizing medium into the mold and into direct contact with a surface of the concrete or mortar composition to cause the composition to expand the metal shell;

wherein the inner mold member diameter is reducible once the composition has reached a determined degree of cure.

23. The pressure cast assembly as recited in claim 22 wherein the fluid pressurizing medium is water.

24. The pressure cast assembly as recited in claim 22 further comprising a displacement tube that is positioned concentrically inwardly of the inner mold member.

25. The pressure cast assembly as recited in claim 22 wherein the fluid pressurizing medium is disposed within an annular fluid chamber formed between the displacement tube and the inner mold member.

26. The pressure cast assembly as recited in claim 25 wherein the pressure of the fluid pressurizing medium is approximately the same at the surface of the concrete or mortar composition as within the annular fluid chamber.

27. The pressure cast assembly as recited in claim 22 further comprising sealing means to contain the concrete or mortar composition within the annular chamber during a pressurizing operation using the fluid pressurizing medium.

28. The pressure cast assembly as recited in claim 22 wherein the top member includes a top ring positioned over an end of the metal shell.

29. The pressure cast assembly as recited in claim 28 wherein surface of the concrete or mortar composition before being pressurized is disposed above an end of the metal shell and is positioned within the top ring.

30. The pressure cast assembly as recited in claim 22 wherein the annular chamber is oriented vertically.

31. The pressure cast assembly as recited in claim 22 wherein the inner mold member is a rigid cylindrical member having opposed longitudinal edges that are movably controlled to reduce the member diameter.

32. The pressure cast assembly as recited in claim 22 wherein the inner mold member is an elastomeric member.

33. The pressure cast assembly as recited in claim 22 wherein the inner mold member is a rigid cylindrical member that can expand and contract a sufficient amount to permit forming the liner and releasing the liner therefrom.

34. The method as recited in claim 22 wherein when the pipe is in an initial state that is not placed into fluid transport service the liner is in a prestressed condition, and wherein when the pipe is in a final state that is placed into fluid transport service the prestress on the liner is essentially eliminated.

* * * * *